(No Model.) 3 Sheets—Sheet 1.

O. R. CHASE.
MACHINE FOR MOLDING OR SHAPING CONFECTIONERY AND OTHER PLASTIC MATERIALS.

No. 279,132. Patented June 12, 1883.

Witnesses:
Walter E. Lombard
W. H. Chapman

Inventor
Oliver R. Chase,
by N. C. Lombard
Attorney.

(No Model.) 3 Sheets—Sheet 2.
O. R. CHASE.
MACHINE FOR MOLDING OR SHAPING CONFECTIONERY AND OTHER PLASTIC MATERIALS.
No. 279,132. Patented June 12, 1883.
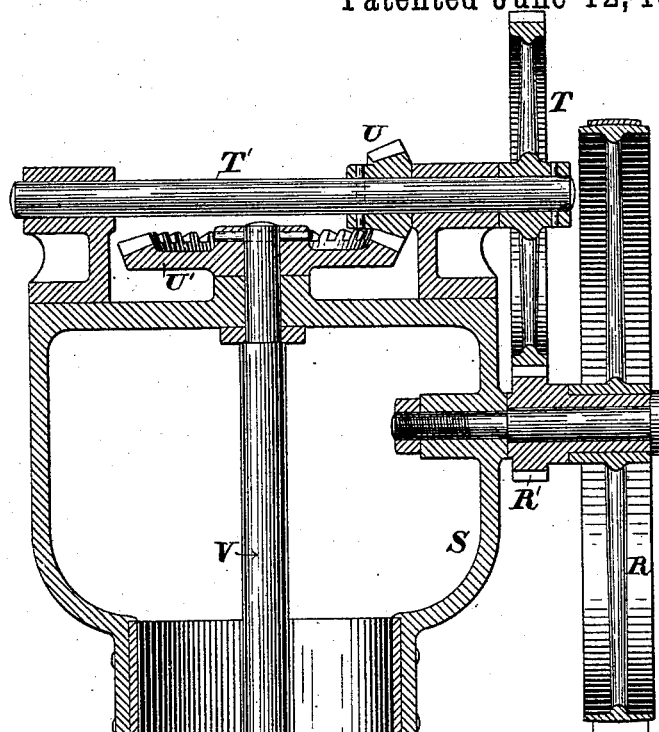
Fig. 2.
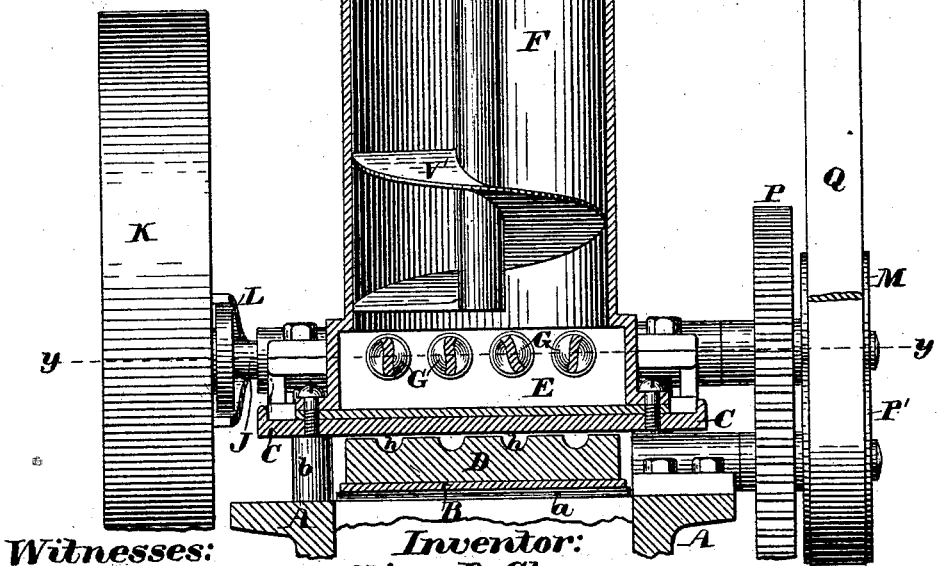
Witnesses:
Walter E. Lombard
W. H. Chapman
Inventor:
Oliver R. Chase,
by N. C. Lombard Attorney.

(No Model.) 3 Sheets—Sheet 3.

O. R. CHASE.
MACHINE FOR MOLDING OR SHAPING CONFECTIONERY AND OTHER PLASTIC MATERIALS.

No. 279,132. Patented June 12, 1883.

Witnesses:
Walter E. Lombard.
W. H. Chapman

Inventor:
Oliver R. Chase,
by N. C. Lombard
Attorney.

UNITED STATES PATENT OFFICE.

OLIVER R. CHASE, OF BOSTON, MASSACHUSETTS.

MACHINE FOR MOLDING OR SHAPING CONFECTIONERY AND OTHER PLASTIC MATERIALS.

SPECIFICATION forming part of Letters Patent No. 279,132, dated June 12, 1883.

Application filed January 20, 1883. (No model.)

*To all whom it may concern:*

Be it known that I, OLIVER R. CHASE, of Boston, in the county of Suffolk and State of Massachusetts, have invented certain new and useful Improvements in Machines for Molding or Shaping Confectionery and other Plastic Materials, of which the following, taken in connection with the accompanying drawings, is a specification.

My invention relates to a machine for molding or shaping plastic materials, and is especially adapted to use in the manufacture of confectionery for forming the plastic sugar paste or dough into sticks or rods; and it consists, first, in the combination of a vertical cylindrical receiver provided with a revolving screw arranged to feed the plastic material placed therein downward, and one or more horizontal screws arranged beneath said vertical cylinder and working in one or more short horizontal cylinders communicating with the chamber beneath said vertical cylinder and its screw, and each provided at its discharge end with a delivery-nozzle of suitable shape to impart the desired form to the material forced therethrough.

It further consists in the combination of a vertically-arranged cylindrical receiver, a screw-piston working in said cylinder, one or more horizontal screws arranged beneath said vertical cylinder and working in short horizontal cylinders communicating with and leading from the chamber beneath the vertical cylinder, and provided with suitably-shaped discharge-nozzles, and an endless apron arranged to travel beneath said vertical cylinder and the discharge-nozzles, and adapted to carry thereon a series of grooved boards to receive the stick or rod of plastic material as it is discharged from the nozzle or nozzles of the horizontal cylinder or cylinders.

Figure 1:
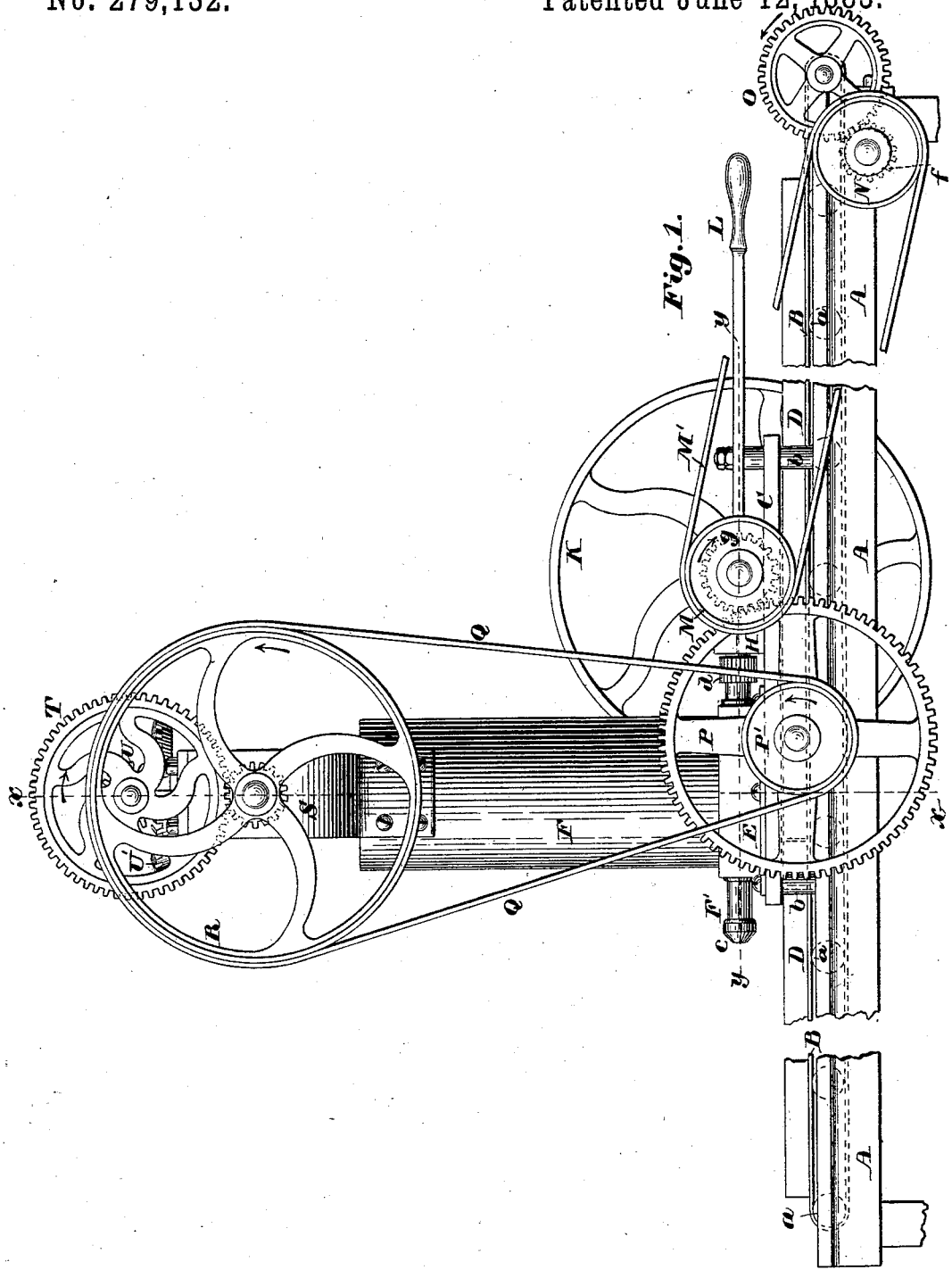
Figure 3:
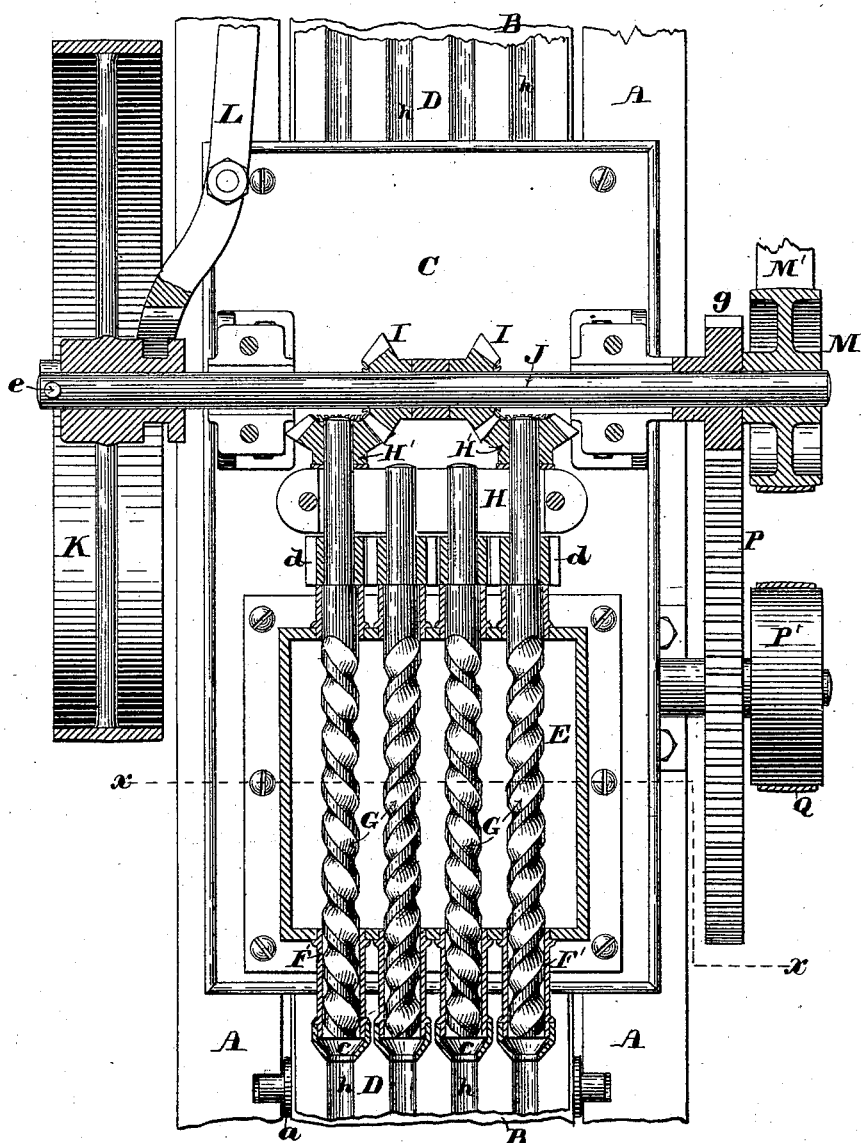

Figure 1 of the drawings is a side elevation of a machine embodying my invention. Fig. 2 is a vertical transverse section of the same on line *x x* on Fig. 1. Fig. 3 is a horizontal section on line *y y* on Figs. 1 and 2.

A is the main frame of the machine, supported upon suitable legs, and having mounted thereon a series of rolls, *a a*, to support and move the endless apron B.

C is a bed-plate supported from the frames A by the studs *b b* at a distance above the apron B sufficient to permit the free passage beneath said bed of the boards D, resting upon and carried by the apron B.

E is a box or chamber bolted to the upper side of the bed C, near its front end, and having secured to its upper side the vertical cylinder F and to its front side one or more small horizontal cylinders, F', each provided with a removable nozzle, *c*, the orifice through which may be circular, as shown, or of any desired shape, according to the shape that it is desired to give to the material to be operated upon.

G G are screw-shafts mounted in bearings H and extending across the chamber E, and having bearings at their front ends in the cylinders F', in which they are revolved, and thereby force the material with which the chamber E is filled through the nozzles *c c*, and deliver it upon the board D, which is moved by the apron B at a speed corresponding to the delivery of the material from said nozzles. The screw-shafts G are each provided with a spur-gear, *d*, and each of the two outside ones with a bevel-gear wheel, H', which meshes into and is acted upon by the bevel-gear wheel I, mounted upon the driving-shaft J.

K is a clutch-pulley mounted loosely upon the shaft J, and arranged to be moved endwise thereon by the shipper-lever L, and to engage with the pin *e* to compel said shaft to revolve therewith. The shaft J has secured upon its other end the pulley M, from which the belt M' leads to the pulley N, which is mounted upon a stud set in the frame A, and has secured thereto a pinion, *f*, which meshes into and imparts motion to the spur-gear wheel *o*, mounted upon the shaft of one of the apron-rolls *a*, as a means of imparting to the apron B a continuous movement beneath the bed C, for the purpose of conveying the boards D beneath the discharge-nozzles *c c* in positions to receive the material being discharged therefrom and convey it away as fast as it is discharged. The shaft J has also secured thereon a spur-pinion (shown in dotted lines at *g* in Fig. 1, and in section in Fig. 3,) which engages with and imparts motion to the spur-gear wheel P, mounted upon a stud secured upon the frame A, and having attached thereto, so as to revolve therewith, the pulley P', by means of which and the belt Q motion is imparted to the pulley R. The pulley R is mounted upon a stud set in the frame S, secured to the upper end of the vertical cylinder or receiver F, and has secured to its hub the pinion R', which engages with and imparts motion to the spur-gear wheel T, secured upon the shaft T', mounted in a horizontal position in bearings formed upon or secured to the upper end of the frame S, as shown in Fig. 2.

The shaft T' has secured thereon the bevel-pinion U, which engages with the bevel-gear wheel U', secured to the upper end of the pendent-shaft V, having its bearing in the cross-bar of the frame S, and provided at its lower end with the broad spiral blade V', the periphery of which just fits the interior of the cylinder F, as shown in Fig. 2.

The operation of my invention is as follows: The machinery being set in motion by operating the shipper-lever L, the cylinder F is filled with the candy-paste or other plastic material to be operated upon, when the action of the spiral blade V' upon said material forces it downward and compacts it in the chamber E and around the screws G G, and they in turn, acting upon the compacted mass, force it horizontally through the cylinders F' and discharge it through the nozzles c c upon the board D, into the grooves h h of which it falls, and is moved away from said nozzles just as fast as it is delivered therefrom, the material being severed at the end of each board D, when the board is removed from the machine with the candy thereon and laid away to harden.

What I claim as new, and desire to secure by Letters Patent of the United States, is—

1. In a machine for molding and shaping plastic materials, the combination of the vertical receiving-cylinder F, the screw-piston V V', one or more horizontal screws, G, and one or more horizontal cylinders, F', each provided with a discharge-nozzle, c, substantially as and for the purposes described.

2. The combination of the cylinder F, screw-piston V V', one or more horizontal screws, G, one or more cylinders, F', each provided with a nozzle, c, the grooved boards D, and means of moving said board beneath said nozzles in unison with the discharge of the material therefrom, substantially as and for the purposes described.

In testimony whereof I have signed my name to this specification, in the presence of two subscribing witnesses, on this 16th day of January, A. D. 1883.

OLIVER R. CHASE.

Witnesses:
E. A. HEMMENWAY,
WALTER E. LOMBARD.